US008935406B1

(12) United States Patent
Eiriksson et al.

(10) Patent No.: US 8,935,406 B1
(45) Date of Patent: Jan. 13, 2015

(54) NETWORK ADAPTOR CONFIGURED FOR CONNECTION ESTABLISHMENT OFFLOAD

(75) Inventors: Asgeir Thor Eiriksson, Sunnyvale, CA (US); Chandrasekhar Srinivasaiah, Cupertino, CA (US); Wael Noureddine, Mountain View, CA (US)

(73) Assignee: Chelsio Communications, Inc., Sunnyvale, CA (US)

( * ) Notice: Subject to any disclaimer, the term of this patent is extended or adjusted under 35 U.S.C. 154(b) by 565 days.

(21) Appl. No.: 11/735,861

(22) Filed: Apr. 16, 2007

(51) Int. Cl.
*G06F 15/16* (2006.01)

(52) U.S. Cl.
USPC ........................................................ 709/227

(58) Field of Classification Search
USPC ................... 370/389, 392, 395.52, 352, 353; 709/227, 229, 230, 232, 236, 250, 225, 709/237; 726/5, 11, 13, 17, 21, 35
See application file for complete search history.

(56) References Cited

U.S. PATENT DOCUMENTS

| | | | |
|---|---|---|---|
| 4,445,116 A | 4/1984 | Grow | |
| 4,533,996 A | 8/1985 | Hartung et al. | |
| 5,058,110 A | 10/1991 | Beach et al. | |
| 5,065,397 A | 11/1991 | Shiobara | |
| 5,497,476 A | 3/1996 | Oldfield et al. | |
| 5,778,189 A | 7/1998 | Kimura et al. | |
| 5,937,169 A | 8/1999 | Connery et al. | |
| 6,087,581 A | 7/2000 | Emmer et al. | |
| 6,141,705 A | 10/2000 | Anand et al. | |
| 6,226,680 B1 | 5/2001 | Boucher et al. | |
| 6,240,094 B1 | 5/2001 | Schneider | |
| 6,247,060 B1 | 6/2001 | Boucher et al. | |
| 6,334,153 B2 | 12/2001 | Boucher et al. | |
| 6,389,479 B1 | 5/2002 | Boucher et al. | |
| 6,393,487 B2 | 5/2002 | Boucher et al. | |
| 6,397,316 B2 | 5/2002 | Fesas, Jr. | |
| 6,401,117 B1 | 6/2002 | Narad et al. | |
| 6,401,177 B1 | 6/2002 | Koike | |
| 6,427,171 B1 | 7/2002 | Craft et al. | |
| 6,427,173 B1 | 7/2002 | Boucher et al. | |

(Continued)

OTHER PUBLICATIONS

Boon S. Ang, "An Evaluation of an Attempt at Offloading TCP/IP Processing onto an i960RN-based iNIC", 2001, Hewlett Packard, p. 1-33.*

(Continued)

*Primary Examiner* — Ryan Jakovac
(74) *Attorney, Agent, or Firm* — Beyer Law Group LLP

(57) ABSTRACT

Coupling circuitry (such as an intelligent network adaptor) couples a network to a host. The host is executing an operating system and is configured for transfer of data between the host and at least one peer via the network using at least one stateful connection to a peer according to a connection-oriented protocol. Indications of attempts to establish stateful connections with a host are received. The coupling circuitry processes each of the received indications by attempting to establish a stateful connection to a peer indicated by that connection establishment attempt indication such that, for a genuine attempt by a peer to establish a stateful connection with the host, the coupling circuitry interoperates with the peer to perform establishment-phase protocol processing of the attempted stateful connection. For each of the established stateful connections, the coupling circuitry operates to cause a state of that established stateful connection to be provided from the coupling circuitry to the host, wherein the operating system of the host handles data transfer phase protocol processing of that established stateful connection.

13 Claims, 3 Drawing Sheets

(56) References Cited

U.S. PATENT DOCUMENTS

| | | |
|---|---|---|
| 6,434,620 B1 * | 8/2002 | Boucher et al. ............... 709/230 |
| 6,460,080 B1 | 10/2002 | Shah et al. |
| 6,463,077 B1 | 10/2002 | Sato |
| 6,470,415 B1 | 10/2002 | Starr et al. |
| 6,510,164 B1 | 1/2003 | Ramaswamy et al. |
| 6,564,267 B1 | 5/2003 | Lindsay |
| 6,591,302 B2 * | 7/2003 | Boucher et al. ............... 709/230 |
| 6,594,268 B1 | 7/2003 | Aukia et al. |
| 6,625,671 B1 | 9/2003 | Collette et al. |
| 6,658,480 B2 | 12/2003 | Boucher et al. |
| 6,681,244 B1 | 1/2004 | Cross et al. |
| 6,687,758 B2 | 2/2004 | Craft et al. |
| 6,697,868 B2 | 2/2004 | Craft et al. |
| 6,701,372 B2 | 3/2004 | Yano et al. |
| 6,708,223 B1 | 3/2004 | Wang et al. |
| 6,708,232 B2 | 3/2004 | Obara |
| 6,717,946 B1 | 4/2004 | Hariguchi et al. |
| 6,735,702 B1 * | 5/2004 | Yavatkar et al. ................ 726/13 |
| 6,751,665 B2 | 6/2004 | Philbrick et al. |
| 6,757,245 B1 | 6/2004 | Kuusinen et al. |
| 6,757,746 B2 | 6/2004 | Boucher et al. |
| 6,792,502 B1 | 9/2004 | Pandya et al. |
| 6,798,743 B1 | 9/2004 | Ma et al. |
| 6,807,581 B1 | 10/2004 | Starr et al. |
| 6,813,652 B2 | 11/2004 | Stadler et al. |
| 6,862,648 B2 | 3/2005 | Yatziv |
| 6,907,042 B1 | 6/2005 | Oguchi et al. |
| 6,925,055 B1 | 8/2005 | Erimli et al. |
| 6,938,092 B2 | 8/2005 | Burns |
| 6,941,386 B2 | 9/2005 | Craft et al. |
| 6,965,941 B2 | 11/2005 | Boucher et al. |
| 6,996,070 B2 | 2/2006 | Starr et al. |
| 7,031,267 B2 | 4/2006 | Krumel |
| 7,042,898 B2 | 5/2006 | Blightman et al. |
| 7,076,568 B2 | 7/2006 | Philbrick et al. |
| 7,089,289 B1 | 8/2006 | Blackmore et al. |
| 7,089,326 B2 | 8/2006 | Boucher et al. |
| 7,093,099 B2 | 8/2006 | Bodas et al. |
| 7,114,096 B2 | 9/2006 | Freimuth et al. |
| 7,124,205 B2 | 10/2006 | Craft et al. |
| 7,133,902 B2 | 11/2006 | Saha et al. |
| 7,133,914 B1 | 11/2006 | Holbrook |
| 7,133,940 B2 | 11/2006 | Blightman et al. |
| 7,136,355 B2 | 11/2006 | Lin et al. |
| 7,155,542 B2 | 12/2006 | Trainin |
| 7,164,656 B2 | 1/2007 | Foster et al. |
| 7,167,926 B1 | 1/2007 | Boucher et al. |
| 7,167,927 B2 | 1/2007 | Philbrick et al. |
| 7,174,393 B2 | 2/2007 | Boucher et al. |
| 7,185,266 B2 | 2/2007 | Blightman et al. |
| 7,191,241 B2 | 3/2007 | Boucher et al. |
| 7,191,318 B2 | 3/2007 | Tripathy et al. |
| 7,239,642 B1 | 7/2007 | Chinn et al. |
| 7,254,637 B2 | 8/2007 | Pinkerton et al. |
| 7,260,631 B1 | 8/2007 | Johnson et al. |
| 7,284,047 B2 | 10/2007 | Barham et al. |
| 7,313,623 B2 | 12/2007 | Elzur et al. |
| 7,320,042 B2 | 1/2008 | Trainin et al. |
| 7,336,608 B2 | 2/2008 | Sin et al. |
| 7,346,701 B2 | 3/2008 | Elzur et al. |
| 7,349,337 B1 | 3/2008 | Mahdavi |
| 7,376,147 B2 | 5/2008 | Seto et al. |
| 7,408,906 B2 | 8/2008 | Griswold et al. |
| 7,447,795 B2 | 11/2008 | Naghshineh et al. |
| 7,453,892 B2 | 11/2008 | Buskirk et al. |
| 7,457,845 B2 | 11/2008 | Fan et al. |
| 7,460,510 B2 | 12/2008 | Olivier et al. |
| 7,474,670 B2 | 1/2009 | Nowshadi |
| 7,493,427 B2 | 2/2009 | Freimuth et al. |
| 7,533,176 B2 | 5/2009 | Freimuth et al. |
| 7,583,596 B1 | 9/2009 | Frink |
| 7,594,002 B1 | 9/2009 | Thorpe et al. |
| 7,596,634 B2 | 9/2009 | Mittal et al. |
| 7,609,696 B2 | 10/2009 | Guygyi et al. |
| 7,613,813 B2 | 11/2009 | Hussain et al. |
| 7,616,563 B1 | 11/2009 | Eiriksson et al. |
| 7,656,887 B2 | 2/2010 | Okuno |
| 7,660,264 B1 | 2/2010 | Eiriksson et al. |
| 7,660,306 B1 | 2/2010 | Eiriksson et al. |
| 7,715,436 B1 | 5/2010 | Eiriksson et al. |
| 7,724,658 B1 | 5/2010 | Eiriksson et al. |
| 7,735,099 B1 | 6/2010 | Micalizzi, Jr. |
| 7,746,780 B2 | 6/2010 | Seo |
| 7,751,316 B2 | 7/2010 | Yarlagadda et al. |
| 7,760,733 B1 | 7/2010 | Eiriksson et al. |
| 7,813,339 B2 | 10/2010 | Bar-David et al. |
| 7,826,350 B1 | 11/2010 | Michailidis et al. |
| 7,831,720 B1 | 11/2010 | Noureddine et al. |
| 7,831,745 B1 | 11/2010 | Eiriksson et al. |
| 7,836,191 B2 * | 11/2010 | Susai et al. .................... 709/229 |
| 7,844,742 B2 | 11/2010 | Pope et al. |
| 7,869,355 B2 | 1/2011 | Kodama et al. |
| 7,924,840 B1 | 4/2011 | Eiriksson et al. |
| 7,929,540 B2 | 4/2011 | Elzur et al. |
| 7,930,349 B2 | 4/2011 | Hussain et al. |
| 7,945,705 B1 | 5/2011 | Eiriksson et al. |
| 8,028,071 B1 * | 9/2011 | Mahalingam et al. ......... 709/227 |
| 8,060,644 B1 | 11/2011 | Michailidis et al. |
| 8,139,482 B1 | 3/2012 | Eiriksson et al. |
| 8,155,001 B1 | 4/2012 | Eiriksson et al. |
| 8,213,427 B1 | 7/2012 | Eiriksson et al. |
| 2001/0010046 A1 | 7/2001 | Muyres et al. |
| 2001/0021949 A1 | 9/2001 | Blightman et al. |
| 2001/0037406 A1 | 11/2001 | Philbrick et al. |
| 2002/0039366 A1 | 4/2002 | Sano |
| 2002/0101848 A1 | 8/2002 | Lee et al. |
| 2002/0188753 A1 * | 12/2002 | Tang et al. ..................... 709/237 |
| 2002/0191622 A1 | 12/2002 | Zdan |
| 2003/0005164 A1 | 1/2003 | Trainin et al. |
| 2003/0018516 A1 | 1/2003 | Ayala et al. |
| 2003/0035436 A1 | 2/2003 | Denecheau et al. |
| 2003/0048751 A1 * | 3/2003 | Han et al. ....................... 370/231 |
| 2003/0067884 A1 | 4/2003 | Abler et al. |
| 2003/0079033 A1 | 4/2003 | Craft et al. |
| 2003/0154298 A1 * | 8/2003 | Lu .................................. 709/230 |
| 2003/0200284 A1 | 10/2003 | Philbrick et al. |
| 2003/0204631 A1 | 10/2003 | Pinkerton et al. |
| 2004/0003094 A1 | 1/2004 | See |
| 2004/0019689 A1 * | 1/2004 | Fan ................................. 709/230 |
| 2004/0028069 A1 | 2/2004 | Tindal et al. |
| 2004/0030745 A1 | 2/2004 | Boucher et al. |
| 2004/0042487 A1 * | 3/2004 | Ossman ......................... 370/466 |
| 2004/0047361 A1 | 3/2004 | Fan et al. |
| 2004/0054813 A1 | 3/2004 | Boucher et al. |
| 2004/0062245 A1 | 4/2004 | Sharp et al. |
| 2004/0062246 A1 | 4/2004 | Boucher et al. |
| 2004/0064578 A1 * | 4/2004 | Boucher et al. ............... 709/236 |
| 2004/0064590 A1 | 4/2004 | Starr et al. |
| 2004/0073703 A1 | 4/2004 | Boucher et al. |
| 2004/0078480 A1 | 4/2004 | Boucher et al. |
| 2004/0088262 A1 | 5/2004 | Boucher et al. |
| 2004/0100952 A1 | 5/2004 | Boucher et al. |
| 2004/0111535 A1 | 6/2004 | Boucher et al. |
| 2004/0117496 A1 | 6/2004 | Mittal et al. |
| 2004/0123142 A1 * | 6/2004 | Dubal et al. .................... 713/201 |
| 2004/0158640 A1 * | 8/2004 | Philbrick et al. ............... 709/230 |
| 2004/0165592 A1 | 8/2004 | Chen et al. |
| 2004/0190533 A1 | 9/2004 | Modi et al. |
| 2004/0199808 A1 | 10/2004 | Freimuth et al. |
| 2004/0213235 A1 | 10/2004 | Marshall et al. |
| 2004/0240435 A1 | 12/2004 | Boucher et al. |
| 2005/0071490 A1 | 3/2005 | Craft et al. |
| 2005/0083850 A1 | 4/2005 | Sin et al. |
| 2005/0083935 A1 | 4/2005 | Kounavis et al. |
| 2005/0102682 A1 | 5/2005 | Shah et al. |
| 2005/0111483 A1 | 5/2005 | Cripe et al. |
| 2005/0120037 A1 | 6/2005 | Maruyama et al. |
| 2005/0125195 A1 * | 6/2005 | Brendel ......................... 702/182 |
| 2005/0135378 A1 | 6/2005 | Rabie et al. |
| 2005/0135396 A1 | 6/2005 | McDaniel et al. |
| 2005/0135412 A1 | 6/2005 | Fan |
| 2005/0135417 A1 * | 6/2005 | Fan et al. ....................... 370/469 |
| 2005/0147126 A1 | 7/2005 | Qiu et al. |
| 2005/0188074 A1 | 8/2005 | Voruganti et al. |

(56) References Cited

U.S. PATENT DOCUMENTS

| | | | |
|---|---|---|---|
| 2005/0190787 A1 | 9/2005 | Kuik et al. | |
| 2005/0216597 A1 | 9/2005 | Shah et al. | |
| 2005/0223134 A1 | 10/2005 | Vasudevan et al. | |
| 2005/0226238 A1 | 10/2005 | Hoskote et al. | |
| 2005/0259644 A1* | 11/2005 | Huitema et al. | 370/389 |
| 2005/0259678 A1 | 11/2005 | Gaur | |
| 2005/0286560 A1 | 12/2005 | Colman et al. | |
| 2005/0289246 A1 | 12/2005 | Easton et al. | |
| 2006/0015618 A1 | 1/2006 | Freimuth et al. | |
| 2006/0015651 A1 | 1/2006 | Freimuth et al. | |
| 2006/0031524 A1 | 2/2006 | Freimuth et al. | |
| 2006/0039413 A1 | 2/2006 | Nakajima et al. | |
| 2006/0072564 A1 | 4/2006 | Cornett et al. | |
| 2006/0075119 A1 | 4/2006 | Hussain et al. | |
| 2006/0080733 A1 | 4/2006 | Khosmood et al. | |
| 2006/0098675 A1 | 5/2006 | Okuno | |
| 2006/0101090 A1* | 5/2006 | Aloni et al. | 707/201 |
| 2006/0133267 A1 | 6/2006 | Alex et al. | |
| 2006/0168649 A1* | 7/2006 | Venkat et al. | 726/5 |
| 2006/0200363 A1* | 9/2006 | Tsai | 705/1 |
| 2006/0206300 A1 | 9/2006 | Garg et al. | |
| 2006/0209693 A1 | 9/2006 | Davari et al. | |
| 2006/0221832 A1 | 10/2006 | Muller et al. | |
| 2006/0221946 A1* | 10/2006 | Shalev et al. | 370/389 |
| 2006/0235977 A1 | 10/2006 | Wunderlich et al. | |
| 2006/0265517 A1 | 11/2006 | Hashimoto et al. | |
| 2006/0268841 A1 | 11/2006 | Nagaraj et al. | |
| 2006/0274788 A1 | 12/2006 | Pong | |
| 2006/0281451 A1 | 12/2006 | Zur | |
| 2007/0011358 A1 | 1/2007 | Wiegert et al. | |
| 2007/0014246 A1* | 1/2007 | Aloni et al. | 370/252 |
| 2007/0033301 A1 | 2/2007 | Aloni et al. | |
| 2007/0064737 A1 | 3/2007 | Williams | |
| 2007/0070901 A1 | 3/2007 | Aloni et al. | |
| 2007/0076623 A1 | 4/2007 | Aloni et al. | |
| 2007/0083638 A1 | 4/2007 | Pinkerton et al. | |
| 2007/0086480 A1 | 4/2007 | Elzur et al. | |
| 2007/0110436 A1 | 5/2007 | Bennett | |
| 2007/0143848 A1* | 6/2007 | Kraemer et al. | 726/23 |
| 2007/0162572 A1 | 7/2007 | Aloni et al. | |
| 2007/0201474 A1* | 8/2007 | Isobe | 370/392 |
| 2007/0233892 A1 | 10/2007 | Ueno | |
| 2008/0002731 A1 | 1/2008 | Tripathy et al. | |
| 2008/0016511 A1 | 1/2008 | Hyder et al. | |
| 2008/0043750 A1 | 2/2008 | Keels et al. | |
| 2008/0089347 A1 | 4/2008 | Phillipi et al. | |
| 2008/0091868 A1 | 4/2008 | Mizrachi et al. | |
| 2008/0135415 A1 | 6/2008 | Han et al. | |
| 2008/0168190 A1 | 7/2008 | Parthasarathy et al. | |
| 2008/0232386 A1 | 9/2008 | Gorti et al. | |
| 2008/0273532 A1 | 11/2008 | Bar-David et al. | |
| 2009/0073884 A1 | 3/2009 | Kodama et al. | |
| 2009/0172301 A1 | 7/2009 | Ebersole et al. | |
| 2009/0222564 A1 | 9/2009 | Freimuth et al. | |
| 2010/0023626 A1 | 1/2010 | Hussain et al. | |
| 2010/0235465 A1 | 9/2010 | Thorpe et al. | |

OTHER PUBLICATIONS

Line Provider, "TCP/IP offload Engine TOE", 2002, p. 1-7, retreived from http://line-provider.com/whitepapers/tcpip-offload-engine-toe/.*
Hewlett Packard, "Using TCP/IP Offload Engine and Receive-Side Scaling to Improve Performance and Efficiency on HP ProLiant Servers in Microsoft® Windows® Environments", 2006, p. 1-8.*
Clark et al., "*An Analysis of TCP Processing Overhead*," IEEE Communications Magazine, Jun. 1989, pp. 23-29.
Woodside et al., "*The Protocol Bypass Concept for High Speed OSI Data Transfer*," Research Paper. Available at:http://citeseer.ist.psu.edu/cache/papers/cs/26104/http:zSzzSzwww.sce.carleton.cazSzftpzSzpubzSzcmwzSzbpjan90.pdf/woodside90protocol.pdf.
Rütsche et al., "*TCP/IP on the Parallel Protocol Engine*," High Performace Networking, (IV, C-14), Elsevier Science Publishers, B.V. North Holland 1993.
Thia et al., "*High-Speed OSI Protocol Bypass Algorithm with Window Flow Control*," IFIP WG6.4 Third International Workshop on Protocols for High-Speed Networks, Stockholm, Sweden, May 13-15, 1992, pp. 53-68.
Thia et al., "*A Reduced Operation Protocol Engine (ROPE) for a Multiple-Layer Bypass Architecture*," Protocols for High-Speed Networks IV, 4th IFIP International Workshop, Aug. 10-12, 1994, Vancouver, B.C., Canada, pp. 224-239.
Rütsche et al., "*Architectures of Multimedia Communication Subsystems*" IFIP Transactions; vol. C-23 archive, Proceedings of the IFIP TC6 International Conference on Information Networks and Data Communication table of contents, pp. 217-230, Year of Publication: 1994.
Dalton et al., "*Afterburner: Architectural Support for High-Performance Protocols*," http://www.hpl.hp.com/techreports/93/HPL-93-46.pdf, Jul. 1993, 18 Pages.
TRM Technologies, Inc., "*L4/L7 Switching*," Downloaded from http://www.trm,ca/pages/t-tech7.html on Feb. 16, 2006, 3 Pages.
Madsen et al., "*Wireless Data Communication*," Fall 2003 Presentation, Wireless Networks Division (WING), Allborg University.
Yocum et al., "*Anypoint: Extensible Transport Switching on the Edge*," Proceedings of the 4th USENIX Symposium on Internet Technologies and Systems, Mar. 26-28, 2003, Seattle, WA, USA.
International Search Report in PCT/US02/12679, dated Jul. 23, 2002.
Office Action in U.S. Appl. No. 10/474,500, mailed Oct. 4, 2007.
Office Action in U.S. Appl. No. 11/137,146, mailed Mar. 5, 2008.
Office Action in U.S. Appl. No. 11/137,140, mailed Feb. 5, 2008.
Office Action in U.S. Appl. No. 11/250,894, mailed Jun. 26, 2008.
Notice of Allowance in U.S. Appl. No. 10/474,500, mailed Jul. 1, 2008.
Allowed Claims from U.S. Appl. No. 10/474,500.
Office Action in U.S. Appl. No. 11/217,661, mailed Sep. 18, 2008.
Office Action in U.S. Appl. No. 11/313,003, mailed Aug. 22, 2008.
Office Action in U.S. Appl. No. 11/330,898, mailed Oct. 8, 2008.
Office Action in U.S. Appl. No. 11/137,146, mailed Nov. 3, 2008.
Office Action in U.S. Appl. No. 11/356,850 mailed Dec. 3, 2008.
U.S. Appl. No. 60/690,465, filed Jun. 14, 2005.
U.S. Appl. No. 60/718,418, filed Sep. 19, 2005.
Office Action in U.S. Appl. No. 11/282,933 mailed Feb. 20, 2009.
Office Action in U.S. Appl. No. 11/250,894 mailed Jan. 26, 2009.
Office Action in U.S. Appl. No. 11/137,140 mailed Mar. 31, 2009.
Office Action in U.S. Appl. No. 11/130,898 mailed Apr. 2, 2009.
Office Action in U.S. Appl. No. 11/747,790 mailed May 12, 2009.
Office Action in U.S. Appl. No. 11/747,793 mailed Jun. 8, 2009.
Notice of Allowance in U.S. Appl. No. 11/313,003, mailed Jun. 8, 2008.
Allowed Claims from U.S. Appl. No. 11/313,003.
Office Action in U.S. Appl. No. 11/217,661 mailed Jun. 9, 2009.
Pratt, Ian and Fraser, Keir, "Arsenic: A User-Accessible Gigabit Ethernet Interface," INFOCOM 2001. Twentieth Annual Joint Conference of the IEEE Computer and Communications Societies. Proceedings. IEEE, vol. 1, Issue , 2001 pp. 67-76 vol. 1.
Office Action in U.S. Appl. No. 11/137,146, mailed Jun. 23, 2009.
Office Action in U.S. Appl. No. 11/137,140, mailed Aug. 21, 2009.
Office Action in U.S. Appl. No. 11/747,650, mailed Aug. 27, 2009.
Office Action in U.S. Appl. No. 11/250,894, mailed Sep. 15, 2009.
Notice of Allowance in U.S. Appl. No. 11/356,850, mailed Jun. 26, 2009.
Allowed Claims from U.S. Appl. No. 11/356,850.
Office Action in U.S. Appl. No. 11/282,933, mailed Sep. 9, 2009.
Notice of Allowance in U.S. Appl. No. 11/330,898, mailed Sep. 23, 2009.
Allowed Claims in U.S. Appl. No. 11/330,898.
Final Office Action in U.S. Appl. No. 11/747,790, mailed Nov. 5, 2009.
Notice of Allowance in U.S. Appl. No. 11/217,661 mailed Jan. 11, 2010.
Allowed Claims from U.S. Appl. No. 11/217,661.

(56) References Cited

OTHER PUBLICATIONS

Notice of Allowance in U.S. Appl. No. 11/282,933 mailed Dec. 31, 2009.
Allowed Claims from U.S. Appl. No. 11/282,933.
Office Action in U.S. Appl. No. 11/747,793, mailed Jan. 25, 2010.
Office Action in U.S. Appl. No. 12/122,570, mailed Feb. 4, 2010.
Office Action in U.S. Appl. No. 11/137,146, mailed Feb. 4, 2010.
Office Action in U.S. Appl. No. 11/747,790, mailed Mar. 9, 2010.
Notice of Allowance in U.S. Appl. No. 11/250,894, mailed Mar. 29, 2010.
Allowed Claims from U.S. Appl. No. 11/250,894.
Office Action in U.S. Appl. No. 11/747,650, mailed Apr. 15, 2010.
Office Action in U.S. Appl. No. 11/747,673, mailed Apr. 30, 2010.
Notice of Allowance in U.S. Appl. No. 11/137,140, mailed Jun. 30, 2010.
Allowed Claims in U.S. Appl. No. 11/137,140.
Notice of Allowance in U.S. Appl. No. 12/122,570, mailed Jul. 8, 2010.
Allowed Claims in U.S. Appl. No. 12/122,570.
Notice of Allowance in U.S. Appl. No. 11/747,650, mailed Jul. 8, 2010.
Allowed Claims in U.S. Appl. No. 11/747,650.
Final Office Action in U.S. Appl. No. 11/747,793, mailed Jul. 23, 2010.
Office Action in U.S. Appl. No. 11/747,790, mailed Aug. 18, 2010.
Office Action in U.S. Appl. No. 12/645,324, mailed Aug. 25, 2010.
Office Action in U.S. Appl. No. 12/752,719, mailed Nov. 10, 2010.
Office Action in U.S. Appl. No. 12/567,581, mailed Nov. 3, 2010.
Office Action in U.S. Appl. No. 11/747,673, mailed Oct. 29, 2010.
Notice of Allowance in U.S. Appl. No. 11/137,146, mailed Dec. 10, 2010.
Allowed claims in U.S. Appl. No. 11/137,146.
Notice of Allowance in U.S. Appl. No. 12/645,324, mailed Dec. 15, 2010.
Allowed Claims in U.S. Appl. No. 12/645,324.
Office Action in U.S. Appl. No. 12/255,112, mailed Dec. 16, 2010.
Notice of Allowance in U.S. Appl. No. 11/747,673, mailed Jun. 30, 2011.
Office Action in U.S. Appl. No. 12/567,581, mailed Mar. 8, 2011.
Office Action in U.S. Appl. No. 12/752,719, mailed May 5, 2011.
Office Action in U.S. Appl. No. 11/747,790, mailed Feb. 17, 2011.
Notice of Allowance in U.S. Appl. No. 12/255,112, mailed May 31, 2011.
Office Action in U.S. Appl. No. 12/567,581, mailed Jul. 28, 2011.
Office Action in U.S. Appl. No. 12/643,897 dated Nov. 2, 2011.
Notice of Allowance in U.S. Appl. No. 12/567,581, mailed Nov. 15, 2011.
Notice of Allowance in U.S. Appl. No. 12/752,719, dated Dec. 8, 2011.
Office Action in U.S. Appl. No. 11/747,790, dated Feb. 7, 2012.
Office Action in U.S. Appl. No. 13/249,077, dated Feb. 22, 2012.
Office Action in U.S. Appl. No. 13/413,196, dated May 10, 2012.
Final Office Action in U.S. Appl. No. 11/747,790, dated Jul. 26, 2012.
Notice of Allowance in U.S. Appl. No. 13/413,196, dated Aug. 31, 2012.
Office Action in U.S. Appl. No. 11/747,793 dated Apr. 5, 2013.
Office Action in U.S. Appl. No. 13/081,392 dated Aug. 7, 2013.
Notice of Allowance in U.S. Appl. No. 11/747,790, mailed Sep. 5, 2013.
Office Action in U.S. Appl. No. 11/747,793 dated Oct. 3, 2013.
Notice of Allowance in U.S. Appl. No. 13/081,392, mailed Nov. 18, 2013.

\* cited by examiner

NETWORK ADAPTOR CONFIGURED FOR CONNECTION ESTABLISHMENT OFFLOAD

BACKGROUND

Denial of Service (DoS) attacks are attempts to deny service of a target computer to legitimate users attempting to access the target computer via a network. In one form, a DoS attack is such that the target computer is forced to expend resources on activities related to the attack. As a result, during the attack, the target computer does not have resources available to provide service to the legitimate users.

One type of DoS attack of this form is a SYN flood attack. During a SYN flood attack, illegitimate TCP/SYN packets (i.e., ones for which there is no intention to initiate a TCP connection) are sent to the target computer. The target computer, handling the illegitimate TCP/SYN packets as legitimate, needlessly consumes resources in responding to the illegitimate TCP/SYN packets with a TCP/SYN-ACK (acknowledgement) packet. Perhaps even worse, the target computer allocates and ties up resources while waiting for details of the "connection"—such details never come. Furthermore, using viruses or other malware, multiple computers on a network such as the internet may be compromised to cause all the computers to simultaneously attack the target computer. Such attacks are known as distributed attacks.

There have been attempts to respond to DoS attacks. For example, SYN cookies may be utilized such that resources of the target computer are not allocated until the sender of the TCP/SYN request, responds with an TCP/ACK to the TCP/SYN+ACK, or even not until the first data carrying packet is received from the peer. The SYN cookies approach requires a modification to the TCP protocol and handling by the target computer.

In some systems, firewalls are employed to distinguish between good traffic and attack traffic. The firewalls confirm that the TCP connections are valid and then proxy packets of the confirmed connection on to the intended destination endpoint. Such firewalls can be effective against DoS attacks. However, resources are utilized during the data transfer phase to handle the overhead of proxying packets of the confirmed connections on to the intended destination.

Even legitimate TCP/SYN packets (i.e., TCP/SYN packets from legitimate peers legitimately intending to initiate a TCP connection), if numerous enough, can bog down a host computer such that, for example, the host computer cannot perform other functions such as communicating on already established connections.

SUMMARY

In accordance with an aspect, coupling circuitry (such as an intelligent network adaptor) couples a network to a host. The host is executing an operating system, and the host is further configured for transfer of data between the host and at least one peer via the network using at least one stateful connection between the host and the at least one peer according to a connection-oriented protocol.

The coupling circuitry receives indications of attempts to establish stateful connections with a host according to the connection-oriented protocol. The coupling processes each of the received indications by attempting to establish a stateful connection to a peer indicated by that connection establishment attempt indication such that, for a genuine attempt by a peer to establish a stateful connection with the host, the coupling circuitry interoperates with the peer to perform establishment-phase protocol processing of the attempted stateful connection between the peer and the host according to the connection-oriented protocol.

For each of the established stateful connections, the coupling circuitry operates to cause a state of that established stateful connection to be provided from the coupling circuitry to the host, wherein the operating system of the host handles data transfer phase protocol processing of that established stateful connection.

DETAILED DESCRIPTION

The inventors have realized that offloading the connection setup requests to an intelligent adapter can be used to increase the connection rate of the hosts. Conventional software implementation of TCP/IP protocol stacks cannot handle incoming SYN packets at line rate. In one example, a host executing software can handle five million incoming SYN requests when connected to 10 Gbps Ethernet, but an intelligent adapter can handle up to 16 million requests, therefore greatly increasing the likelihood that a DoS attack will not be successful. In accordance with an inventive aspect, connection setup activities of a host with respect to stateful connections (such as using the TCP/IP protocol) are offloaded to offload circuitry such as to a network interface card. The offload circuitry handles connection setup activities such that resources of the host are not allocated until the connection is set up. The connection is transferred to the host by providing, from the offload circuitry to the host, data indicative of the connection state such that the host can handle the protocol processing of the data transfer phase of the established stateful connection.

Figure 1:
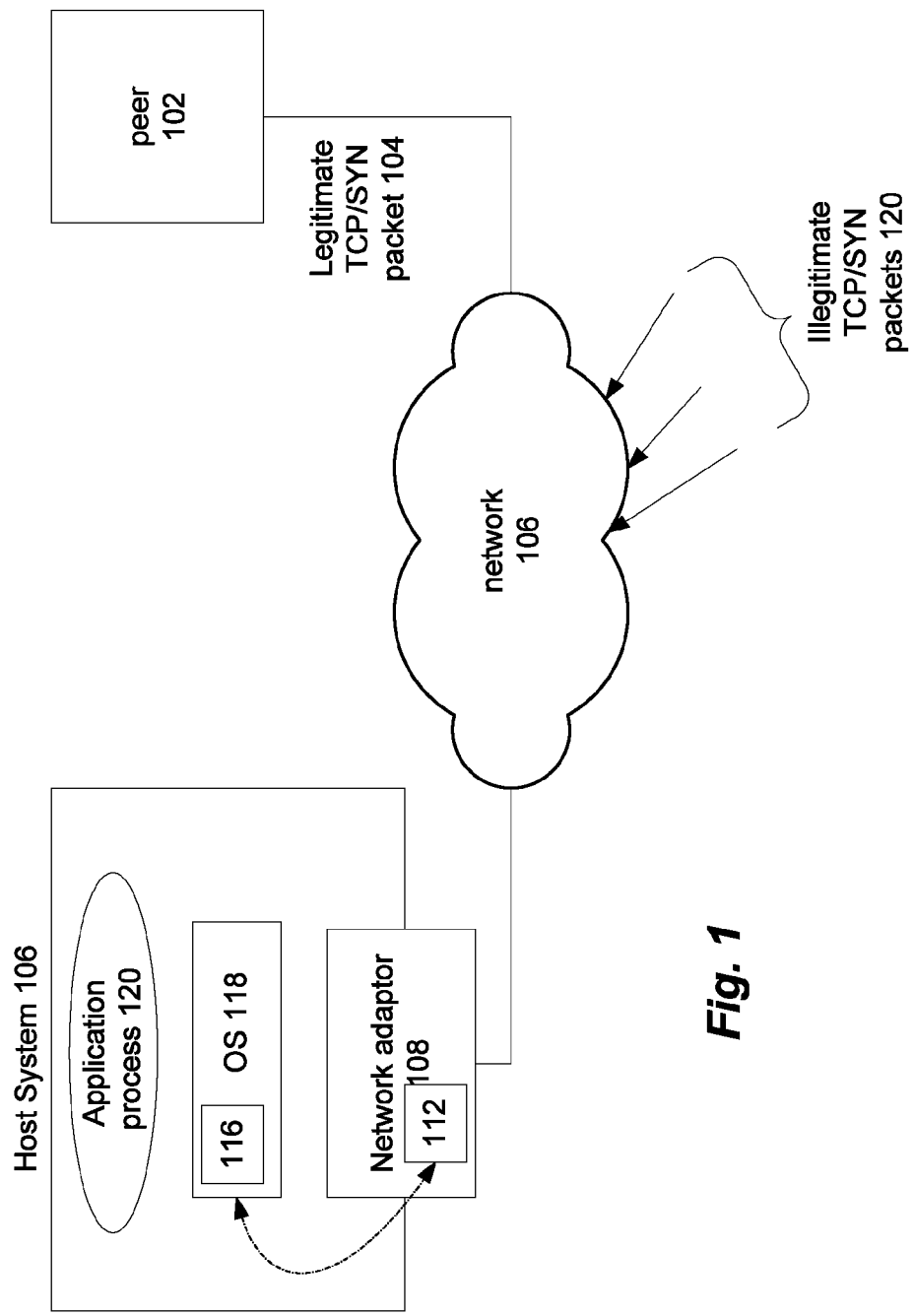
FIG. 1 schematically illustrates an architecture of a system in which setup activities of a host with respect to stateful connections (such as using the TCP/IP protocol) are offloaded to offload circuitry such as to a network interface card.

FIG. 1 schematically illustrates an architecture of a system in accordance with this aspect. Referring to FIG. 1, a peer 102 is configured to provide a legitimate TCP/SYN packet 104, via a network 106 (such as the internet) in an attempt to establish a connection with the host 106. Network adaptor circuitry 108 (e.g., such as a network interface controller card) associated with the host 106 receives the legitimate TCP/SYN packet 104 and attempts (indicated by reference numeral 110) to establish a TCP/IP connection with the peer 102. Thus, for example, the attempt 110 may comprise engaging in connection setup activities with the peer according to the TCP/IP protocol.

In the case where a TCP/SYN packet is legitimate (e.g., the TCP/SYN packet 104), the connection setup activities result, in the network adaptor 108, in data 112 characterizing the established connection. The connection is then "transferred" to a protocol stack of an operating system 118 being executed by the host 106. In one example, the data 112 characterizing the established connection is copied from memory of the network adaptor 108 to memory associated with the operating system 118 being executed by the host. In another example, the operating system 118 accesses the data 112 in a memory that is shared between the operating system 118 and the network adaptor 108 or is otherwise accessible to the operating system 118. The operating system 118 handles data transfer phase protocol processing of the established connection.

Even the case where the TCP/SYN packet is not legitimate (e.g., the illegitimate TCP/SYN packets 120), the network adaptor circuitry 108 associated with the host 106 attempts (again indicated by reference numeral 110) to establish a TCP/IP connection with the nominal peer, which is the peer indicated in the received illegitimate TCP/SYN packet. Thus, for example, the attempt 110 may in this case comprise attempting to engage in connection setup activities with the nominal peer according to the TCP/IP protocol. A connection will not be established based on a received illegitimate TCP/SYN packet and, thus, resources of the operating system 118 will not be implicated in dealing with illegitimate TCP/SYN packets.

Another type of attack may include illegitimate TCP/SYN+ACK packets being sent. In this case, where the network adaptor circuit 108 has no knowledge of a corresponding TCP/SYN packet that should have preceded a received illegitimate TCP/SYN+ACK packet, there will be no or minimal corresponding processing in the network adaptor 108 and, perhaps more significantly, resources of the OS 118 will not be implicated in processing (or otherwise resulting from) the illegitimate TCP/SYN+ACK packets.

Figure 2:
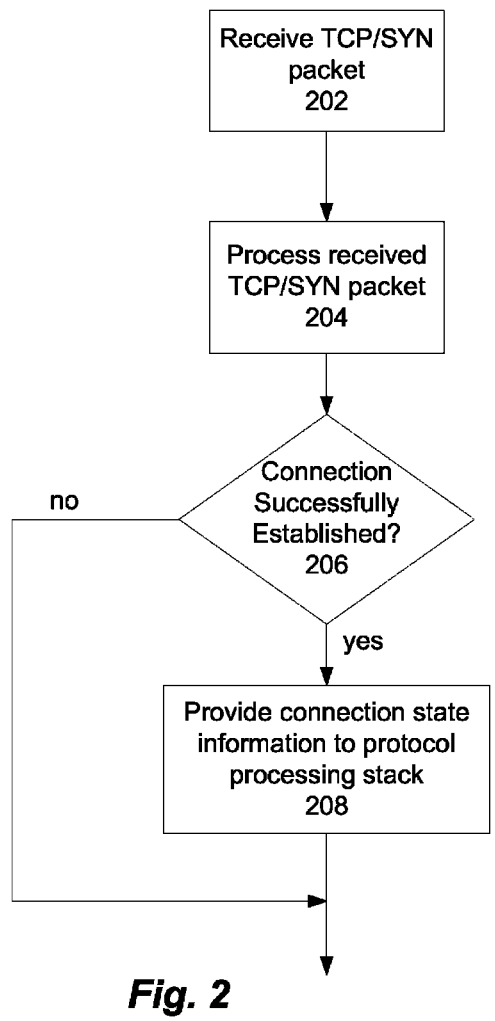
FIG. 2 is a flowchart illustrating an example of processing in the network adaptor of the FIG. 1 architecture.

FIG. 2 is a flowchart illustrating processing in a network adaptor in accordance with an inventive aspect. At step 202, a TCP/SYN packet is received. At step 204, the received TCP/SYN packet is processed in an attempt to establish a TCP connection based on the received TCP/SYN packet. At step 206, it is determined if a connection has been successfully established. For example, there may be a wait time between steps 204 and 206 or within the processing of step 204. Based on a determination that a connection has not been successfully established, the processing in FIG. 2 ends. Based on a determination that a connection has been successfully established, at step 208, the connection state information for the established connection is caused to be provided to a protocol processing stack (e.g., of a host operating system). In this way, the host need not be involved with the illegitimate connection attempts and, even for legitimate connection attempts, the connection rate can be increased by offloading the connection setup.

Figure 3:
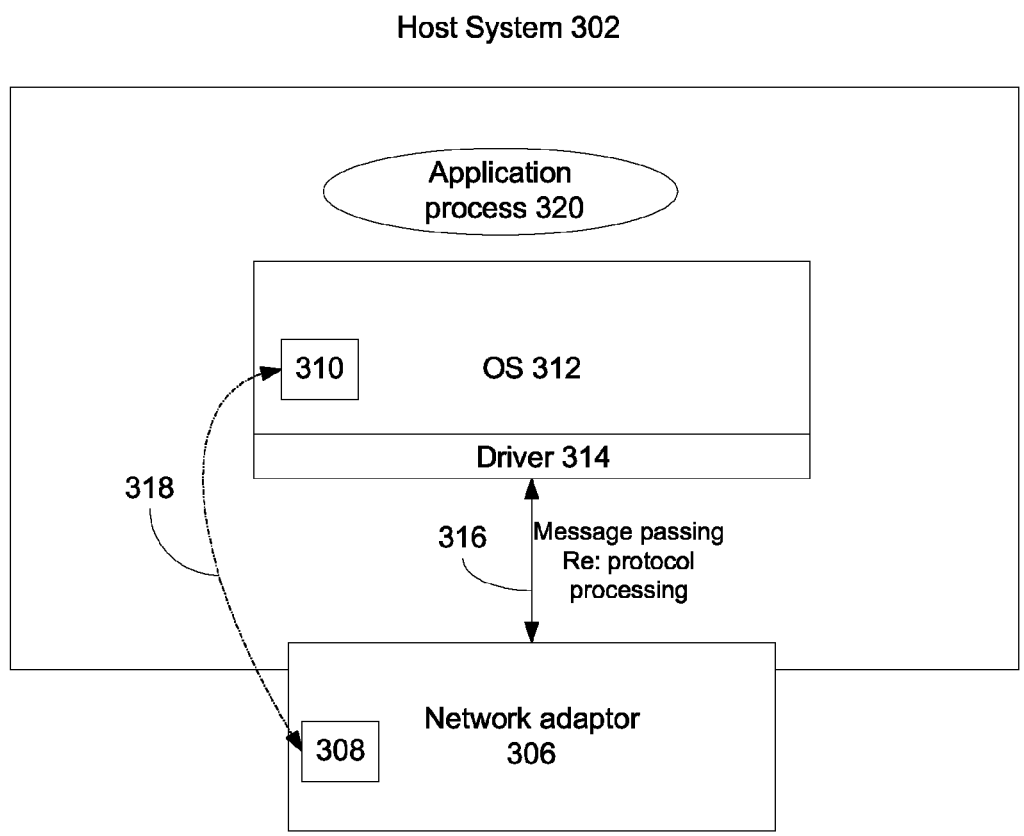
FIG. 3 schematically illustrates, in slightly greater detail than that illustrated in FIG. 1, the interface between the network adaptor and the OS of the host system.

FIG. 3 schematically illustrates, in slightly greater detail than that illustrated in FIG. 1, the interface between the network adaptor 306 and the OS 312 of the host system 302. In particular, referring to FIG. 3, the network adaptor 308 includes memory in which data of the state of an established connection is stored. The network adaptor 306 communicates with a driver 314 of the operating system 312 via a message passing protocol 316. The operating system 312 may be, for example, a general purpose or special purpose operating system that includes a protocol processing stack. The protocol processing stack is configured to operate a connection to a peer based on data of the state of a connection stored in a memory 310 accessible to the protocol processing stack of the operating system.

Based on the messages exchanged via the message passing protocol 316 (generated at least in part based on a connection to a peer being established by the network adaptor 306), the data of the state of the established connection may be transferred 318 from the memory of the network adaptor 306 to the memory 310 of the protocol processing stack.

It is noted that a network adaptor configured to establish a stateful connection and then to pass the state of the stateful connection to a host for data transfer phase protocol processing may comprise hardware alone, primary a programmed processor, or may be some combination. In some examples, the network adaptor comprises a populated interface card configured to communicate with the host via interface circuitry such as via a PCI local bus.

What is claimed is:

1. A method of operating coupling circuitry that couples a network to a host, the host further configured for transfer of data between the host and at least one peer via the network according to a TCP connection-oriented protocol, the method comprising:

by the coupling circuitry, receiving indications corresponding to TCP connection establishment phase messages to the host from a nominal peer according to the connection-oriented protocol, wherein the indications corresponding to connection establishment phase messages are messages including TCP SYN information from the nominal peer;

by the coupling circuitry, processing each of the received indications by attempting to perform appropriate responsive processing in accordance with the connection-oriented protocol such that, when the nominal peer is an actual peer, the coupling circuitry interoperates with the actual peer to perform TCP connection establishment phase protocol processing of an attempted stateful connection between the host and the actual peer according to the connection-oriented protocol to accomplish establishment of a stateful TCP connection, wherein attempting to perform appropriate responsive processing includes providing at least one message including TCP SYN+ACK information to the nominal peer and thereafter receiving at least one message including an ACK to the TCP SYN+ACK information from the nominal peer, wherein accomplishing establishment of the stateful connection includes generating TCP connection state data in the coupling circuitry characterizing the established stateful TCP connection, wherein the TCP connection state data includes a state of the established stateful TCP connection; and by the coupling circuitry, for each of the established stateful TCP connections, causing the generated TCP connection state data characterizing that established stateful TCP connection to be provided from the coupling circuitry to be accessible to a TCP protocol processing stack of the host based on a determination that the TCP connection has been successfully established and without the coupling circuitry itself handing any data transfer phase processing of the established TCP connection prior to causing the generated TCP connection state data to be accessible to the TCP protocol processing stack of the host, whereby the generated TCP connection state data is usable by the host to handle data transfer phase protocol processing of that established stateful TCP connection, for transfer of data between the host and at least one peer via the network, wherein prior to each connection having been established by interoperation of the coupling circuitry with the actual peer and the resulting generated TCP connection state data having been provided from the coupling circuitry to be accessible to the protocol processing stack of the host for data transfer processing of that TCP connection, resources of the host for that TCP connection are not allocated or involved.

2. The method of claim 1, wherein:

for a first particular connection establishment phase message including ACK of TCP SYN+ACK information from a nominal peer that, according to the connection-oriented protocol is to be preceded by a corresponding second particular connection establishment message including a TCP SYN information from a nominal peer, determining that the appropriate response is no response when there is no preceding corresponding second particular connection establishment message.

3. The method of claim 1, further comprising:
by the host, receiving the generated TCP connection state data characterizing the state of that established stateful TCP connection and handling the data transfer phase processing of that established stateful TCP connection using the received generated TCP connection state data characterizing the state of that established stateful TCP connection, for transfer of data between the host and at least one peer via the network.

4. The method of claim 1, wherein:
the coupling circuitry is at least a portion of circuitry comprising an intelligent network adaptor that is a network interface card.

5. The method of claim 1, wherein:
the coupling circuitry includes a combination of hardware and a programmed microprocessor.

6. The method of claim 1, wherein:
the coupling circuitry does not provide the host particular generated TCP connection state data characterizing an established stateful TCP connection until after the TCP stateful connection is established.

7. A method of operating coupling circuitry that couples a network to a host, the host further configured for transfer of data between the host and at least one peer via the network using at least one stateful connection between the host and the at least one peer according to a connection-oriented protocol, wherein the connection-oriented protocol includes a definition of at least a connection establishment phase and of a data transfer phase, the definition of the connection establishment phase including at least a first message that is a request by a peer to connect with the host, a second message that is a response by the host to the peer acknowledging the first message, and a third message that is a response from the peer to the host acknowledging the second message, wherein a proper exchange of the first message, the second message and the third message according to the connection-oriented protocol is necessary to establish a stateful connection between the peer and the host, the method comprising:
by the coupling circuitry, receiving indications each corresponding to a nominal connection establishment attempt first message by a nominal peer to establish a stateful connection with the host according to the connection-oriented protocol;
by the coupling circuitry, for each of the received nominal stateful connection establishment attempts first messages, processing that received nominal stateful connection establishment attempt first message by providing an appropriate response second message, according to the connection-oriented protocol, to that connection establishment attempt, such that at least some of the appropriate second message each result in receipt of an appropriate third message and therefore an established stateful connection; and
by the coupling circuitry, for each of the established stateful connections as a result of the coupling circuitry interoperating with a peer to accomplish establish phase processing for that stateful connection, causing generated connection state data characterizing that established stateful connection and including a state of that established stateful connection to be provided from the coupling circuitry to be accessible to a protocol processing stack of the host based on a determination that the connection has been successfully established and without the coupling circuitry itself handing any data transfer phase processing of the established connection prior to causing the generated connection state data to be accessible to the protocol processing stack of the host, whereby the generated connection state data is usable by the host to handle data transfer phase protocol processing of that established stateful connection, for transfer of data between the host and at least one peer via the network,
wherein prior to each connection having been established by interoperation of the coupling circuitry with the actual peer and the resulting generated connection state data having been provided from the coupling circuitry to be accessible to the protocol processing stack of the host for data transfer processing of that connection, resources of the host for that connection are not allocated or involved.

8. The method of claim 7, further comprising:
by the host, receiving the generated connection state data characterizing the state of that established stateful connection and handling the data transfer phase processing of that established stateful connection, for transfer of data between the host and at least one peer via the network, using the received generated connection state data characterizing the state of that established stateful connection.

9. The method of claim 7, wherein:
the connection-oriented protocol is TCP/IP.

10. The method of claim 7, wherein:
the coupling circuitry is at least a portion of circuitry comprising an intelligent network adaptor.

11. The method of claim 7, wherein:
the coupling circuitry includes a combination of hardware and a programmed microprocessor.

12. The method of claim 7, wherein:
the coupling circuitry does not provide the host any of the particular generated connection state data characterizing an established a stateful connection until after the stateful connection is established by the coupling circuitry.

13. An intelligent network adaptor to couple a network to a host that is configured for transfer of data between the host and at least one peer via the network according to a connection-oriented protocol, wherein the connection-oriented protocol includes a definition of at least a connection establishment phase and of a data transfer phase, the definition of the connection establishment phase including at least a first message that is a request by a peer to connect with the host, a second message that is a response by the host to the peer acknowledging the first message, and a third message that is a response from the peer to the host acknowledging the second message, wherein a proper exchange of the first message, the second message and the third message according to the connection-oriented protocol is necessary to establish a stateful connection between the peer and the host, the network adaptor comprising a processor and a memory, wherein the processor is configured to process instructions in the memory to:
receive indications of attempts to establish stateful connections with a host according to the connection-oriented protocol, wherein the indications of attempts are indications of first messages of the connection establishment phase of the connection-oriented protocol; process each of the received indications by interoperating with the at least one peer, attempting to establish a stateful connection to a nominal peer indicated by said received indication, by attempting to exchange with the nominal peer second and third messages of the connection establishment phase of the connection-oriented protocol, such that, for a genuine attempt by a peer to establish a stateful connection with the host, the intelligent network adaptor successfully interoperates with the peer to perform establishment-phase protocol processing of the attempted stateful connection between the peer and the host according to the connection-oriented protocol to actually accomplish establishment of the stateful connection, wherein accomplishing establishment of the stateful connection includes generating connection state data in the network adaptor during the connection establishment phase of the connection according to the connection-oriented protocol, the connection state characterizing the established stateful connection and including a state of the established stateful connection; and for each of the established stateful connections, cause the generated connection state data characterizing that established stateful connection to be provided from the coupling circuitry to be accessible to a protocol processing stack of the host based on a determination that the connection has been successfully established and without the coupling circuitry itself handing any data transfer phase processing of the established connection prior to causing the generated connection state data to be accessible to the protocol processing stack of the host, whereby the generated connection state data is usable by the host to handle data transfer phase protocol processing of that established stateful connection, for transfer of data between the host and at least one peer via the network, wherein prior to each connection having been established by interoperation of the intelligent network adaptor with the actual peer and the resulting generated connection state data having been provided from the intelligent network adaptor to be accessible to the protocol processing stack of the host for data transfer processing of that connection, resources of the host for that established stateful connection are not allocated or involved.

* * * * *